(12) United States Patent
Zhang et al.

(10) Patent No.: US 6,550,365 B1
(45) Date of Patent: Apr. 22, 2003

(54) COPING SAW

(75) Inventors: Weidong Zhang, No. 39 Longshan Road, Tengzhou City, Shandong Province, P.R. (CN), 277500; Lin Lin, Tenghou (CN); Fantong Kong, Tengzhou (CN)

(73) Assignee: Weidong Zhang, Tengzhou (CN)

( * ) Notice: Subject to any disclaimer, the term of this patent is extended or adjusted under 35 U.S.C. 154(b) by 0 days.

(21) Appl. No.: 09/619,816

(22) Filed: Jul. 20, 2000

Related U.S. Application Data

(63) Continuation-in-part of application No. 09/093,377, filed on Jun. 8, 1998, now abandoned.

(30) Foreign Application Priority Data

Jun. 10, 1997 (CN) .................... 97233276 U

(51) Int. Cl.[7] .............. B27B 19/04; B27B 13/00
(52) U.S. Cl. .............. 83/785; 83/747; 83/427
(58) Field of Search .................. 83/747, 748, 780, 83/783, 785, 788, 427

(56) References Cited

U.S. PATENT DOCUMENTS

| | | | | | |
|---|---|---|---|---|---|
| 173,319 | A | * | 2/1876 | McChesney | 83/698.31 |
| 199,845 | A | * | 1/1878 | McChesney | 83/669.21 |
| 420,319 | A | * | 1/1890 | Tardent | 83/747 |
| 1,820,294 | A | * | 8/1931 | Anderson | 83/785 |
| 1,958,132 | A | | 5/1934 | Davis | 83/575 |
| 2,072,590 | A | | 3/1937 | Lowry et al. | 83/752 |
| 2,613,701 | A | * | 10/1952 | Nathan | 137/106 |
| 2,753,898 | A | | 7/1956 | MacFarland | 554/210 |
| 2,771,102 | A | | 11/1956 | Carmichael | 83/748 |
| 2,772,708 | A | | 12/1956 | Miquel | 83/697 |
| 2,792,033 | A | * | 5/1957 | Bradley | 83/747 |
| 3,358,541 | A | | 12/1967 | Frei | 83/554 |
| 3,908,723 | A | * | 9/1975 | Hill | 220/575 |
| 4,116,101 | A | * | 9/1978 | Kawakami et al. | 83/427 |
| 5,924,209 | A | * | 7/1999 | Ward | 30/392 |

FOREIGN PATENT DOCUMENTS

| | | |
|---|---|---|
| EP | 0 174 282 A2 | 3/1986 |
| GB | 2 082 114 A | 3/1982 |
| GB | 2 205 274 A | 12/1988 |
| WO | WO 88/09249 | 12/1988 |

* cited by examiner

*Primary Examiner*—Boyer Ashley
(74) *Attorney, Agent, or Firm*—Westman, Champlin & Kelly

(57) ABSTRACT

A coping saw includes a housing and a flexible conveyor belt supported by at least three balancing wheels being supported rotatably on said housing. A saw blade is connected with one end of an upper saw blade holding mechanism and one end of a lower saw blade holding mechanism at its two ends respectively. A driving mechanism is driven by a motor and connected to the flexible conveyor belt through a sliding block.

2 Claims, 2 Drawing Sheets

COPING SAW

This is a continuation-in-part application of U.S. patent application Ser. No. 09/093,377, filed Jun. 8, 1998, now abandoned and entitled "VERTICALLY SAWING COPING SAW WITH CONSTANT TENSION AND SUPPLE TRANSMISSION MATERIAL", which application is hereby incorporated fully by reference in its entirety.

Coping saws have been widely used all over the world. In the past, although many improvements have been made, there continue to be shortcomings such as low sawing efficiency, poor sawing quality, high waste of saw blades, large no-load power, serious vibration and noises, limited range of sawing thickness, limitation of shape change, and so on. Moreover, all of coping saw blades can not be rotated, which the sawteeth lie in one direction. The workpiece must be rotated in order to fulfill curvilinear sawing. This causes two serious problems. One problem is complexity of rotating the workpiece. In particular, when the workpiece is bulky, the sawing efficiency is very low. Another problem is the limited dimensions of the workpiece. That is, the length of the workpiece is not larger than the blade depth of the sweep saw, otherwise, the workpiece can not be rotated. Therefore, the coping saw has become larger and larger, and the sawed workpiece must be as small as possible. The above mentioned defects have badly limited the use of the coping saw. At present, a kind of coping saw with high quality is desired urgently in the market.

The object of the invention is to provide a coping saw, which has essentially overcome the above defects, and really met the requirements of high sawing efficiency and quality, low waste of saw blades and energy, slight vibration and noises. It also enlarges the sawing thickness range and is capable of being designed in any shape at will. It can optionally adjust the angle of the saw blades in a 360-degree range. The saw can saw any length workpiece. Furthermore, the saw has improved working efficiency. It is an invention totally different from the existing coping saws, not only in theory, but also in the actual shape and structure.

There are two important factors for good curvilinear sawing:

There are two most important factors for good curvilinear sawing:

(1) The saw blade must move vertically. Otherwise, the workpiece can not be cut or the saw blades will be broken when we swerve the workpiece.

(2) The saw blade must be strained tightly and the tension must be constant. Otherwise, the bend of the blade caused by the push of the workpiece may make the sawing fail or break the blade. In order to achieve high-quality curvilinear sawing, the coping saw must be designed to satisfy the above two conditions. However, such a coping saw has not existed until present invention.

According to prior art, there are three kinds of coping saws as follows:

(1) A coping saw with C-type rod.
The movement of the saw blades is not vertical yet the tension is constant.

(2) A coping saw with parallelogram-type rod.
It is evident that the saw blade has a fore-and-back movement along with its vertical movement while the saw rod is swinging up and down. Thus, the resultant movement of the saw blade is not really vertical, however, the tension is constant.

(3) A coping saw strained by spring.
The movement of the saw blade is vertical yet its tension is not constant. The tensile force of the spring varies according to the movement of the saw blade. The larger the amplitude of the saw blade, the larger the variation of the tensile force. Furthermore, the motor will stop running if the saw blade pulled by the spring is strained too tightly.

The expanding usage of these coping saws is rather limited due to the above-mentioned problems.

The other existing problems of these coping saws will be further described as follows:

(1) The amplitude of the saw blade moving up and down cannot be too large because large amplitude causes variations in the tension. Generally, the range of the saw blade's movement is limited between 7 mm and 15 mm, which leads to low sawing efficiency and poor sawing quality. Furthermore, such small amplitude, is only $1/16$–$1/6$ of the total length of the saw blade such that most saw-teeth of the saw blade do not participate in sawing operation, which is a big waste.

(2) Most power from the motor is used to swing the saw rod or to pull the spring, which causes a large amount of no-load power consumption. The efficient power only accounts for one fifth of the total power.

(3) The swinging saw rod (sometimes it weighs 2 kg) and the tensile spring cause serious vibration and noises when a coping saw is running.

(4) The thicker the cut article is, the larger the resistance the saw blade will encounter if the blade does not move vertically, or has inconstant tension, and the saw blade is further apt to be broken. As a result, the thickness of the cut article is much limited.

(5) The rigid saw rod limits the variety of outline of the coping saw.

The above problems which exist in a coping saw are due to the saw blade's incapability of moving vertically, or its inconstant tension or the existance rigid saw rod.

Among all the coping saws that have been publicly disclosed, none of them can simultaneously realize constant tension and vertical movement of the saw blade.

Next, the applicant would like to compare present invention with related arts provided by the search.

(1) The saws disclosed in U.S. Pat. No. 2,753,898 are saws with C-type rod.

(2) The saws disclosed in U.S. Pat. No. 2,072,590, U.S. Pat. No. 1,958,132, and U.S. Pat. No. 2,771,102 are saws strained by spring.

The saw rods of the above two kinas of saws are rigid and can not realize supple transmission, so that they all have the problems of inconstant tension or non-vertical movement.

(3) Though the saws disclosed in UK2205274 has supple transmission material, the whole transmission system is not independent, and the drive devices are connected in series. Therefore, the tension of the saw blade is still varied rather than constant.

When rollers reach the locations of points C and F, the length of AC is equal to that of GF. When rollers reach the locations of points D and E after turning 90°, point C has moved leftward a raduis-long distance, and have moved downward a radius-long distance as well. Point F has moved rightward a radius, and at the same time moved upward a radius. Though the respective leftward and rightward movement of points C and F does not cause length variation of the whole supple material, the vertical movement of points C and F makes both sides of the supple material become longer simultaneously. Consequently, the tension is increased. When the saw blade is being strained tightly, it will suffer a great variation in tension even as the supple material only has a tiny change in length. From the attached figure, we can understand that the length variation of supple material is very large when rollers are running, so that the resultant tension variation of the saw blade is enormous.

(4) Though the saw disclosed in UK2082114 has supple transmission material, the whole transmission system is not independent, and the drive devices are linked in series. So the tension of its saw blade is still inconstant rather than fixed.

When rod AB swings to the location of line CD, point A has not only a leftward movement but also a downward movement. Point B moves rightward and upward at the same time. The right-and-left movement of points A and B willnot cause the length variation of supple material. However, their up-and-down movement will cause the same so that the tension of the saw blade is increased sharply. When the mechanism is operating, the tension of the saw blade is not constant. Furthermore, the larger the amplitude is, the larger the tension variation that the saw blade has.

Though the above two patents have been issued, the schemes still have not been converted into practical products into market because of their poor practicability and low sawing quality. Curvilinear sawing cannot realize by both of the schemes. The reason is that their transmission and tension systems are not independent but are connected with a drive machine in series instead. They still have not resolved the two difficult problems existing in curvilinear sawing.

Although Swiss Patent No. 654.241 discloses a sweep saw, a great deal of difficulty will be encountered in the realization process of the invention based on the scheme described in the patent, and its functions will possibly not be realized.

Therefore the invention is devoid of practicability. Details are provided as follows:

1. In the tensioning system of the Swiss Patent, the tensioning or releasing of the circular system is achieved by pressing the pinch wheel 47 or lifting the flexible belt 45 on the balancing wheels 46 and 48. In practical operation, the circular system is released first, then the saw is dismounted or installed, and then the circular system is tightened, during which period the entire circular system is required to elongate or diminish by 2 centimeters. In terms of the blade depth of 40 centimeters of the average-type 16" sweep saw, the pinch wheel 47 has to move 6.4 centimeters upwards or downwards in order to adjust the flexible system by 2 centimeters. Correspondingly, the motion ratio is 3:2:1. It is difficult for the pinch wheel 47 to accurately adjust the tension force within the range of 6.4 centimeters by means of the rotation of the lever 52 of the cam 53, because the cam is not in circular so that the displacement values of the downward motion of the pushing lever 62 pushed by its various parts are irregular. However, there is a strict requirement on the tension of the saw. It is hard to control the adjustment of the tension force by rotating the cam.

2. According to the Swiss Patent, the saw 31 is held by the weight block 34, and the weight block 34 is integrated with the saw 31, which causes trouble for the operation. If a circle plate is sawn in a wood block, sometimes, it is required to be mounted on the original wood block in use so that neither of them could be destroyed. The Swiss Patent is not able to achieve such a saw, because the weight block 34 is too massive to penetrate the 0.5-millimeter hole which is pre-opened for the cutting of the circle with the same thickness as that of the saw.

3. The built-in dynamo 5 of the Swiss Patent precludes the reduction of the size of the said machine. The mode of installation of the vertical dynamo increases the complexity of the connection between the drive and the working mechanism, thereby greatly Increases the cost of production and the rate of failure.

4. According to the Swiss Patent, the circulation motion system is joined with many components, for example, 35, 36, 39, 31, 34, 22, 21, etc., as well as other relevant parts, whose total weight exceeds one kilogram. Such a heavy object has to move upward and downward for 1720 times per minute under the pull of the flexible system with its rate reaching 50 kilos per square second. The flexible system produces a large pulling force which exceeds the elastic deformation force of the same. As a consequence, the flexible object is only subject to elastic deformation under the driving force of the dynamo and is unable to move together with the components against the inertia. This point is further proved by experiments when the flexible object is in elastic deformation, the saw only shakes without ability of sawing anything. If one increases the strength of the flexible object and causes the entire system to go into motion, this is equal to hammering the machine using a one-kilogram hammer at a high speed. Furthermore, the resultant vibration and noise is un-tolerable, and the machine can hardly be used.

5. Limited by the structure described in the Swiss Patent, the appearance of the device cannot be changed but can only take the form of a square framework. Therefore, it will not be able to meet the specific aesthetic demands of different people.

Based on the above, although the Swiss Patent No. 654,241 describes a particular structure, it is not practicable. It is heavy, complex in structure, expensive and has a strong vibration. Furthermore, it is not easy to tighten the saw and the saw cannot penetrate the small opening, and it is incapable of upward and downward movement except vibrations, therefore, it is incapable of arc sawing. Such an invention will not achieve the desired function and will not be accepted. People would rather choose a sweep saw of other structures than buy a machine that pleases the eye but is of no practical use. This is the reason why no products or commodities based on the patent have ever come into being since the publication of the patent many years ago.

In addition, no description that the blades of the coping saw can be rotated has been disclosed in the prior art. The saw machine must be large enough to saw the massive and heavy workpieces because the blade can not be rotated. This causes high manufacture cost and low sawing efficiency.

In a word, limitations exist with all current coping saws due to their serious flaws and the effect of curvilinear sawing leaves much to be desired. With the increasing improvements of living conditions and peoples' pursuit for the perfect sawn workpieces, excellent coping saws are urgently desired. Therefore, having studied all kinds of existing coping saws, we invented this new type of coping saw.

The object of the invention is providing a coping saw, which has essentially solved the difficult problems that the existing coping saws have met and actually have realized both the vertical movement and constant tension of the saw blade. And it can rotate the saw blades in a 360-degree range. Thus, it simplifies the flexible motion system to the utmost extent. The whole machine runs steadily and produces relatively less noise. It makes the effect of curvilinear sawing perfect.

SUMMARY OF THE INVENTION

Figure 1:
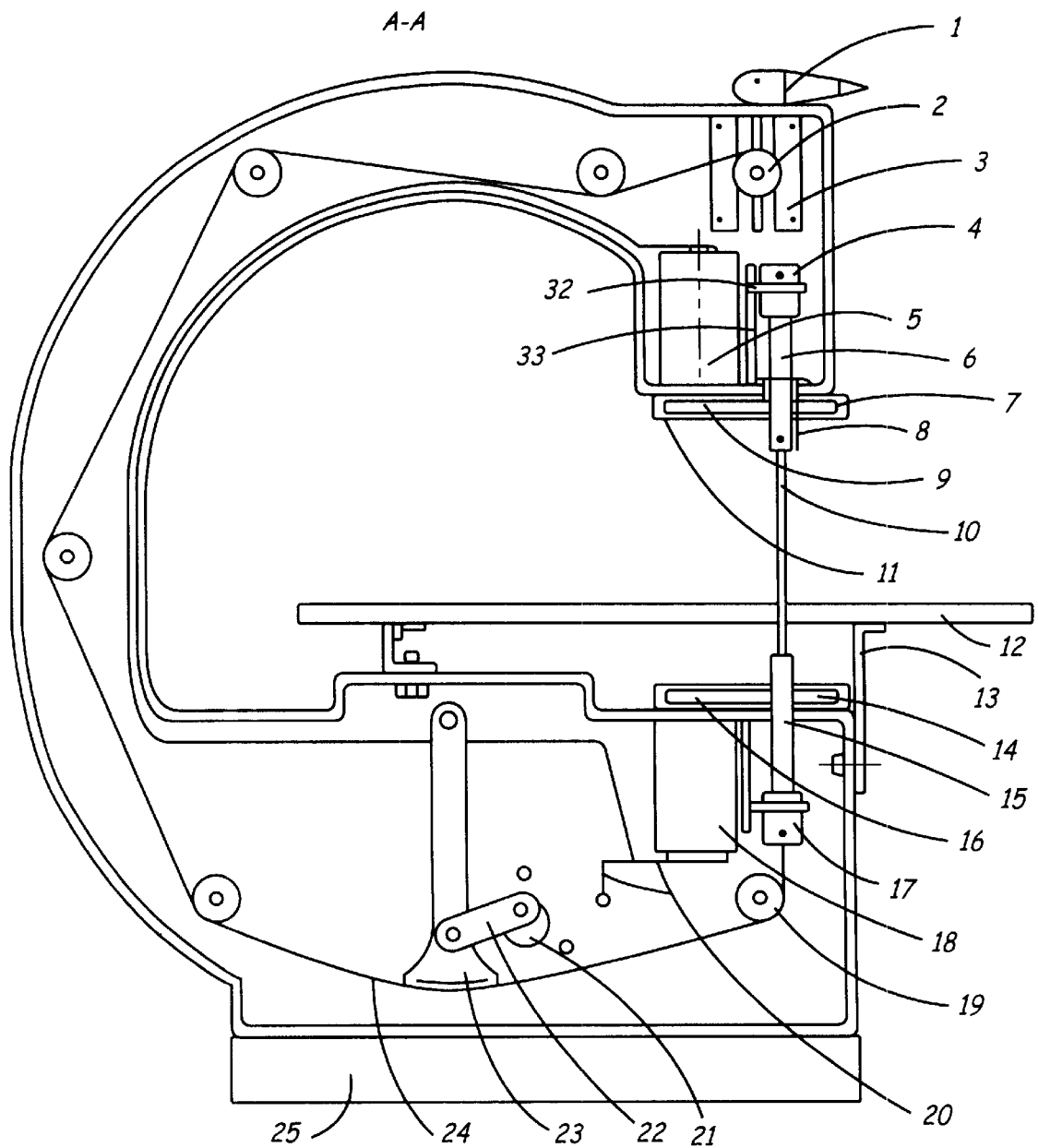
FIG. 1 is a cross-sectional view of a coping saw in accordance with the present invention taking along a line labeled A--A in FIG. 2.

The present invention provides a coping saw in which a flexible conveyor belt 24 supported by at least two balancing wheels 19 and the saw blade holding mechanism 6, 15, together with the saw blade 10, form an enclosed separate circular system. The system has realized constant tension of the saw blade by means of tensioning mechanism 1, 2. This flexible circular system is in parallel connection with driving mechanism 21, 22, 23 and 24. The driving mechanism drives the flexible circular system to perform reciprocal movement so as to set the saw blade in vertical reciprocal motion in order to realize the function of curvilinear sawing.

In order to improve sawing efficiency, decrease the dimensions of the coping saw and reduce the manufacturing cost, the present invention provides a structure for adjusting the rotation of saw blades. Said structure is characterized in that: a transmitter 5 and a receiver 18 connected with each other through a conducting wire 20 are mounted on the housing of the coping saw. Here, said transmitter 5 and receiver 18 are known in the art, and are also referred to as an angle self-adjusted machine, thus the description on its structure and operating principle will be omitted. The invention has a structure for rotating the saw blade in a 360-degree range. That is, a gear hub 11 is mounted on the housing of the coping saw, on to which a large gear 7 and a small gear 9 and the transmitter 5 are fixed. The upper saw rod 6 moves up and down through the hole of the large gear 7 and the large gear 7 can drive the saw rod 6 to rotate. An inverting joint 4 in which a bearing is installed is provided between conveyor belt 24 and saw rod 6 in order to prevent the flexible conveyor belt 24 from being rotated while the saw rod is rotating. The inverting joint 4 is provided with a direction block 32 connected with a guide lever 33. The conveyor belt 24 will not rotate at all within the limit of said structure when the angle of the saw blade is being adjusted. The mounting and adjusting structure of the receiver 18 is the same as that of the transmitter 5, as shown in FIG. 1. When the saw blade is required to rotate, the large gear 7 is rotated so as to drive the small gear 9 to rotate. The axle of the transmitter 5 is rotated so as to drive the receiver 18 to rotate because the small gear 9 is connected with the axle of the transmitter 5. The small gear 16 drives the large gear 14 to rotate so as to drive the saw blade to rotate. The upper and lower gears are adjusted in a same angle simultaneously.

By means of the above mentioned structure, the present invention has realized both the vertical movement and constant tension of the saw blade, and can rotate the saw blades in a 360-degree range. The present invention meets the requirements of high sawing efficiency and quality, low waste of saw blade and energy, slight vibration and noises. It also enlarges the sawing thickness range and is capable of being designed in any shape at will. Whatever length the workpiece has, the coping saw can saw it. It is not necessary to manufacture a massive and heavy saw machine. All redundant components have been deleted in the present invention, thus simplifying the flexible motion system to the utmost extent. The whole machine runs steadily and produces relatively less noise. The present invention is less liable to failures.

Figure 2:
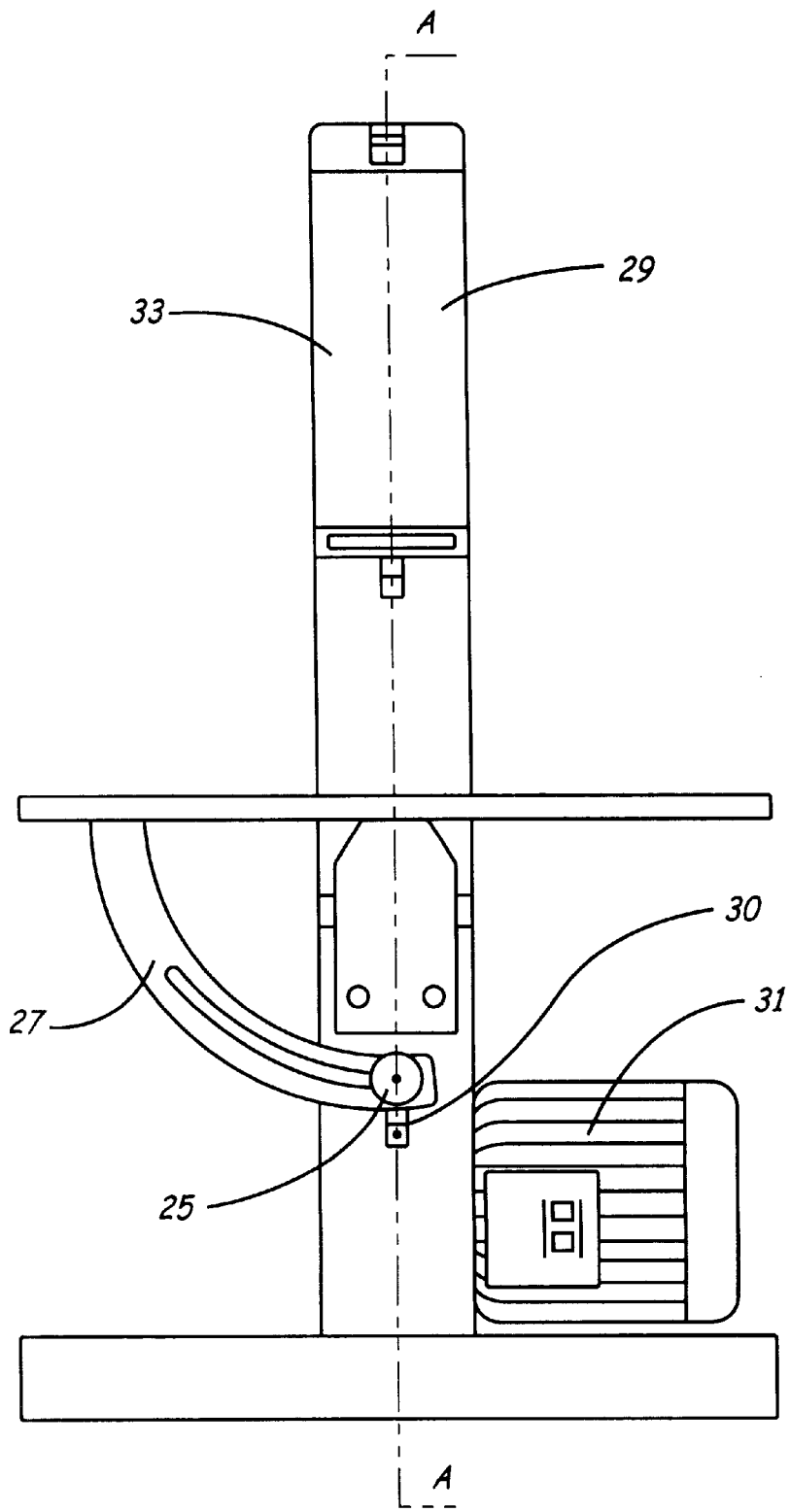
FIG. 2 is a front plan view of the coping saw of FIG. 1.

Referring to the attached FIG. 1 and FIG. 2, 25 is the housing, housing 25 and working table 12 are mounted on the base. Supporting rollers 19 are fitted in housing 25, flexible driving belt 24 is sustained by supporting rollers 19, while both ends of driving belt 24 are respectively connected with upper saw rod 6 and lower saw rod 15. Driving belt 24 is brought into reciprocating movement by the driving of the transmission mechanism powered by motor 31. It is necessary to install at least three supporting rollers 19. The transmission mechanism may be constituted as follows. Connecting lever 22 is installed on eccentric roller 21, while sliding block is installed on connecting lever 7. One end of guide rod 23 is connected with sliding block, and the other end is connected with guide rod base. Driving belt 24 is connected with inverting joint 4. The transmission mechanism can also adopt other structure to make the driving belt 24 reciprocate. There are six supporting rollers 19 installed. Supporting roller 19 as tension roller 2 above the upper end of upper saw rod 6 is installed on tight-adjusting frame 3, while on the upper end of which adjusting handle 1 is installed. To adjust the tension of saw blade 10, we can adjust the handle 1 to make tight-adjusting frame 3 move to drive tension roller 2. Then, the goal of adjusting the tension of the saw blade is achieved. The adjustment has a motion ratio of 1:1. The adjustable length is constant for every circle of the adjusting handle 1. Driving belt 24 is supple and may be made of polyurethane. Lower saw rod 15 is installed in the hole of large gear 14. Upper saw rod 6 is installed in the hole of large gear 7. Both ends of the saw blade 10 are connected with upper saw rod 6 and lower saw rod 15 respectively. When saw blade 10 moves vertically, its sawteeth are oriented to one direction all the time without inclination. When present invention is working, eccentric roller 21 driven by motor 31 is rotating, which makes driving belt 24 reciprocate, for driving belt 24 is connected with sliding block. As a result, saw blade 10 is driven to move up and down to realize sawing. When the saw blade 10 is required to rotate to saw a massive workpiece, the large gear 7 is rotated so as to drive saw blade 10 to rotate through small gear 9, the transmitter 5, the receiver 18, the small gear 16 and large gear 14. In FIG. 1, the reference number 8 is direction pointer, 13 is support, 17 is inverting joint, 26 is handle, 27 is scale plate, 28 is left housing, 29 is right housing, 30 is pointer.

What is claimed:

1. A coping saw, comprising:
    a housing;
    a flexible conveyor belt supported by at least three balancing wheels, said at least three balancing wheels being supported rotatably on said housing;
    a saw blade connected with one end of an upper saw blade holding mechanism and one end of a lower saw blade holding mechanism at its two ends respectively, the other ends of said upper and lower saw blade holding mechanism being connected with said flexible conveyor belt respectively, thus forming an enclosed separated circular system;
    a driving mechanism driven by a motor and connected with said flexible conveyor belt through a sliding block, and driving said upper and lower saw blade holding mechanism and said saw blade to reciprocate in the vertical direction through said flexible conveyor belt;
    a transmitter connected with one of said upper and lower saw blade holding mechanism and sending out a signal corresponding to a rotating angle of said one of the upper and lower saw blade holding mechanism through gearing, said gearing including a large gear and a small gear engaged with each other, said large gear being used for driving said saw blade to rotate manually and initially, said one of the upper and lower saw blade holding mechanism passing through said large gear and reciprocating in the vertical direction, and said small gear connected with said transmitter; and a receiver driving the other one of said upper and lower saw blade holding mechanism to rotate with said one of the upper and lower saw blade holding mechanism synchronously through another gearing according to received signal from said transmitter, said gearing including a large gear and a small gear engaged with each other, the other one of said upper and lower saw blade holding mechanism passing through said large gear and reciprocating in the vertical direction, and said small gear connected with said receiver.

2. A coping saw, comprising:

a housing;

a flexible conveyor belt supported by at least three balancing wheels, said at least three balancing wheels being supported rotatably on said housing;

a saw blade connected with one end of an upper saw blade holding mechanism and one end of a lower saw blade holding mechanism at its two ends respectively, the other ends of said upper and lower saw blade holding mechanism being connected with s aid flexible conveyor belt respectively, thus forming an enclosed separated circular system;

a driving mechanism driven by a motor and connected with said flexible conveyor belt through a sliding block, and driving said upper and lower saw blade holding mechanism and said saw blade to reciprocate in the vertical direction through said flexible conveyor belt;

a transmitter connected with one of said upper and lower saw blade holding mechanism and sending out a signal corresponding to a rotating angle of said one of the upper and lower saw blade holding mechanism through gearing, said gearing including a large gear and a small gear engaged with each other, said large gear being used for driving said saw blade to rotate manually and initially, said one of the upper and lower saw blade holding mechanism passing through said large gear and reciprocating in the vertical direction, and said small gear connected with said transmitter;

a receiver driving the other one of said upper and lower saw blade holding mechanism to rotate with said one of the upper and lower saw blade holding mechanism synchronously through another gearing according to a received signal from said transmitter, said gearing including a large gear and a small gear engaged with each other, the other one of said upper and lower saw blade holding mechanism passing through said large gear and reciprocating in the vertical direction, and said small gear connected with said receiver;

a direction pointer used for indicating the direction of the saw teeth of said saw blade and rotating with said saw blade synchronously.

\* \* \* \* \*

UNITED STATES PATENT AND TRADEMARK OFFICE
CERTIFICATE OF CORRECTION

PATENT NO. : 6,550,365 B1
DATED : April 22, 2003
INVENTOR(S) : Weidong Zhang et al.

It is certified that error appears in the above-identified patent and that said Letters Patent is hereby corrected as shown below:

<u>Column 7,</u>
Line 5, insert -- a -- before "received".
Line 20, change "s aid" to -- said --.

Signed and Sealed this

Second Day of December, 2003

JAMES E. ROGAN
*Director of the United States Patent and Trademark Office*